US012705887B1

(12) United States Patent
Temple et al.

(10) Patent No.: US 12,705,887 B1
(45) Date of Patent: Aug. 11, 2026

(54) PROVIDING FEEDBACK BASED ON PHYSICAL OBJECTS IN A THREE-DIMENSIONAL ENVIRONMENT

(71) Applicant: Apple Inc., Cupertino, CA (US)

(72) Inventors: Brian W. Temple, Santa Clara, CA (US); Ioana Negoita, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/887,437

(22) Filed: Sep. 17, 2024

Related U.S. Application Data

(60) Provisional application No. 63/584,482, filed on Sep. 21, 2023.

(51) Int. Cl.

| | |
|---|---|
| ***G06V 20/20*** | (2022.01) |
| ***G06F 3/01*** | (2006.01) |
| ***G06Q 30/0601*** | (2023.01) |
| ***G06T 7/20*** | (2017.01) |
| ***G06V 20/68*** | (2022.01) |
| ***G06V 30/10*** | (2022.01) |

(52) U.S. Cl.
CPC .............. *G06V 20/20* (2022.01); *G06F 3/013* (2013.01); *G06Q 30/0633* (2013.01); *G06T 7/20* (2013.01); *G06V 20/68* (2022.01); *G06V 30/10* (2022.01); *G06T 2207/30196* (2013.01)

(58) Field of Classification Search
CPC ........ G06V 20/20; G06V 20/68; G06V 30/10; G06F 3/013; G06Q 30/0633; G06T 7/20; G06T 2207/30196
See application file for complete search history.

(56) References Cited

U.S. PATENT DOCUMENTS

2014/0172555 A1* 6/2014 Argue ................ G06Q 30/0633 705/26.8
2016/0335712 A1* 11/2016 Tapley ................. H04N 21/816
2022/0113542 A1* 4/2022 Pappas ....................... G06T 7/90
2023/0394561 A1* 12/2023 Gurgul ............... G02B 27/0172

OTHER PUBLICATIONS

Rees, Katie, Avoid Your No-Go Foods With These Food Scanner Apps, Retrieved from: <https://www.makeuseof.com/food-scanner-apps/ >, [retrieved on: Jan. 16, 2025], Feb. 11, 2022, 21 pages.
Sayer, Jason, "Hyper-Reality" Visualized in Medellín Envisions Capitalism Enveloping the City and Daily Life, Retrieved from: <https://www.archpaper.com/2016/06/hyper-reality-keiichi-matsuda/>, Jun. 1, 2016, 6 pages.

* cited by examiner

*Primary Examiner* — Premal R Patel
(74) *Attorney, Agent, or Firm* — Kubota & Basol LLP

(57) ABSTRACT

In some examples, an electronic device presents, via a display, a three-dimensional environment of the electronic device. In some examples, the electronic device detects, using one or more input devices, a shopping container in the three-dimensional environment. In some examples, the electronic device initiates a scoring mode and while in the scoring mode, in accordance with a determination that one or more first criteria are satisfied, the electronic device presents via the display, a representation of a score of the shopping container in the three-dimensional environment. In some examples, the score of the shopping container is calculated determined based on a plurality of objects in the shopping container.

24 Claims, 12 Drawing Sheets

PROVIDING FEEDBACK BASED ON PHYSICAL OBJECTS IN A THREE-DIMENSIONAL ENVIRONMENT

CROSS-REFERENCE TO RELATED APPLICATIONS

This application claims the benefit of U.S. Provisional Application No. 63/584,482, filed Sep. 21, 2023, the entire disclosure of which is herein incorporated by reference for all purposes.

FIELD OF THE DISCLOSURE

This relates generally to systems and methods of providing feedback based on physical objects in a three-dimensional environment.

BACKGROUND OF THE DISCLOSURE

Some computer graphical environments provide two-dimensional and/or three-dimensional environments where at least some objects displayed for a user's viewing are virtual and generated by a computer. Consumers often make food purchases without an understanding of the quality and nutritional value of the purchase. Thus, there is a need for systems and methods to inform consumers of this information to enable a consumer to better meet their nutrition goals.

SUMMARY OF THE DISCLOSURE

Some examples of the disclosure are directed to systems and methods for calculating and presenting a representation of a score corresponding to one or more physical objects detected in the three-dimensional environment. In some examples, an electronic device is in communication with a display and one or more input devices. In some examples, the electronic device presents, via the display, the three-dimensional environment of the electronic device. In some examples, the electronic device detects, using the one or more input devices, a shopping container in the three-dimensional environment. In some examples, the electronic device initiates a scoring mode and while in the scoring mode, the electronic device presents, via the display, a representation of a score of the shopping container in the three-dimensional environment in accordance with a determination that one or more first criteria are satisfied. In some examples, the score of the shopping container is calculated based on a plurality of objects in the shopping container.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
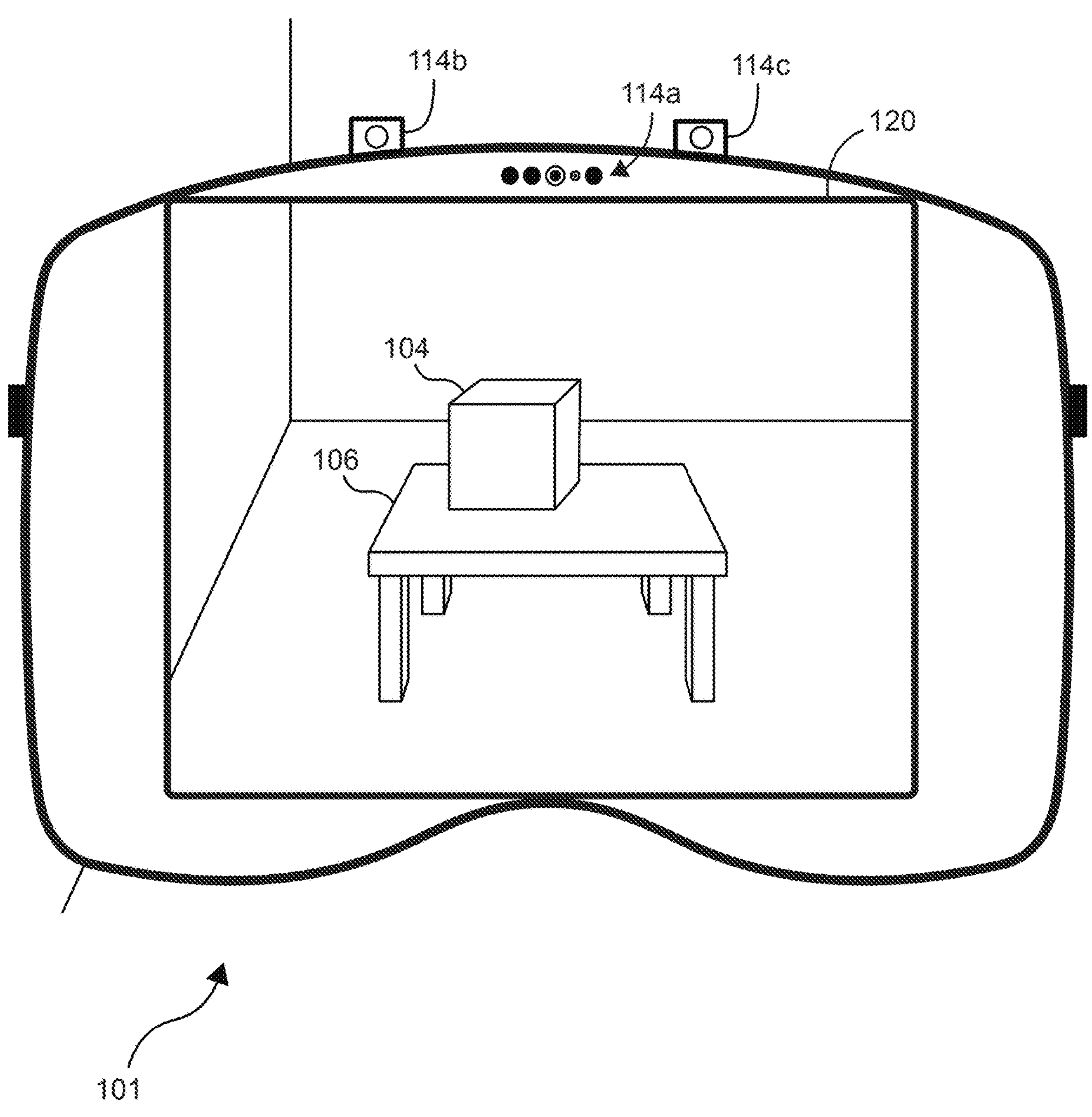
FIG. 1 illustrates an electronic device presenting an extended reality environment according to some examples of the disclosure.

Some examples of the disclosure are directed to systems and methods for calculating and presenting a representation of a score corresponding to one or more physical objects detected in the three-dimensional environment. In some examples, an electronic device is in communication with a display and one or more input devices. In some examples, the electronic device presents, via the display, the three-dimensional environment of the electronic device. In some examples, the electronic device detects, using the one or more input devices, a shopping container in the three-dimensional environment. In some examples, the electronic device initiates a scoring mode and while in the scoring mode, the electronic device presents, via the display, a representation of a score of the shopping container in the three-dimensional environment in accordance with a determination that one or more first criteria are satisfied. In some examples, the score of the shopping container is calculated based on a plurality of objects in the shopping container.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors **114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101** and/or movements of the user's hands or other body parts.

In some examples, display 120 has a field of view visible to the user (e.g., that may or may not correspond to a field of view of external image sensors **114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment detected by external image sensors 114*b* and 114*c***.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
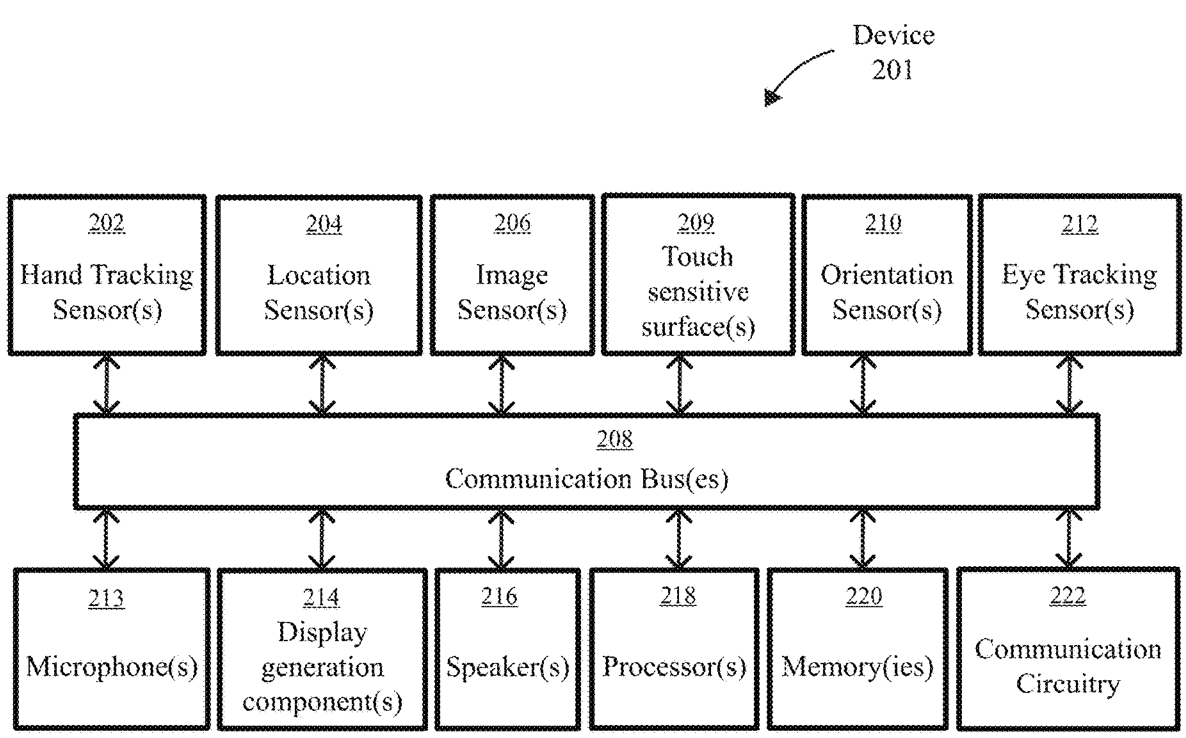
FIG. 2 illustrates a block diagram of an example architecture for a device according to some examples of the disclosure.

FIG. 2 illustrates a block diagram of an example architecture for a device 201 according to some examples of the disclosure. In some examples, device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114*a* and/or external image sensors 114*b* and 114*c* in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more displays 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a GPS receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., a hand, leg, or torso, or head of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement detected by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more displays, one or more speakers, one or more processors, one or more memories, and/or communication circuitry. A person or persons using electronic device 201, is optionally referred to herein as a user or users of the device.

Attention is now directed towards exemplary displays of a three-dimensional environment on an electronic device (e.g., corresponding to electronic device 201). As discussed below, the electronic device may detect, using one or more input devices (e.g., image sensor(s) 206), a physical object in the real-world, such as a shopping container or other container to transport food items and/or merchandise. In some examples, and as will be described in more detail below, the electronic device, using optical character recognition (OCR), computer vision, and/or other scanning technology, calculates a score based on food items and/or other consumable physical objects placed in a user's shopping container to help the user be more mindful of the foods they will be eating. In some examples, the score is calculated based on an amount of food processing (e.g., NOVA classification: unprocessed, minimally processed, processed, ultra-processed foods). In some examples, the score is calculated based on a number of factors, such as whether the food item is organic or sustainable, its place of origin, prevalence of specific food allergies, or another scoring factor. Reading food labels, shopping for nutritious foods is both time-consuming and largely error prone, and typically includes guesswork on the part of the user. Some existing food scanning applications require that a user manually enter a description of a food item and/or scan a barcode of the food item using their mobile device; however, these applications still do not provide an efficient way to detect that the attention of the user is directed to a food item and automatically present a score associated with the food item without requiring the user to provide further inputs to manually enter a description of a food item and/or scan a barcode of the food item using their mobile device. Additionally, these applications still do not provide a way to continuously scan for food items placed in the shopping container, calculate and/or keep track of a total or cumulative score of the food items in the shopping container.

To solve the technical problem outlined above, an exemplary embodiment of the electronic device provides a three-dimensional environment where food items in a physical marketplace and/or in a shopping container are scanned and identified based, at least in part, on the user's intention to purchase the food items. Further, when the food item is placed in the shopping container, the electronic device presents, via a display, a representation of a total score associated with the food items in the shopping container in the three-dimensional environment in a manner that does not clutter the three-dimensional environment. This avoids disruption of the presentation of the three-dimensional environment and the user's shopping experience, thus reducing user inputs involved with opening an app, manually entering a description of each of the food items, and/or positioning a camera of the user's mobile device to scan a respective barcode of each of the food items. Further, the user does not need to mentally keep track of the food items placed in the shopping container and calculate the total nutritional score for all the food items in the shopping container. For example, the user may set up a nutrition goal or a caloric intake goal that includes a particular total nutritional score. In some examples, the electronic device automatically displays one or more suggested food items to improve the total nutritional score which avoids additional user inputs of navigating to an app on the electronic device to search for suggested food items when food alternatives are desired quickly, thereby reducing the amount of time needed for the user to research food alternatives and avoid errors in the interaction between the user and the electronic device, which reduces power usage, inputs needed to corrects errors, and improves battery life of the electronic device by enabling the user to use the electronic device more quickly and efficiently.

FIGS. 3A-3I illustrate calculating and presenting a representation of a score corresponding to one or more physical objects detected in the three-dimensional environment according to some examples of the disclosure. FIGS. 3A-3I are used to illustrate the processes described below, including the process in FIG. 4.

Figure 3A:
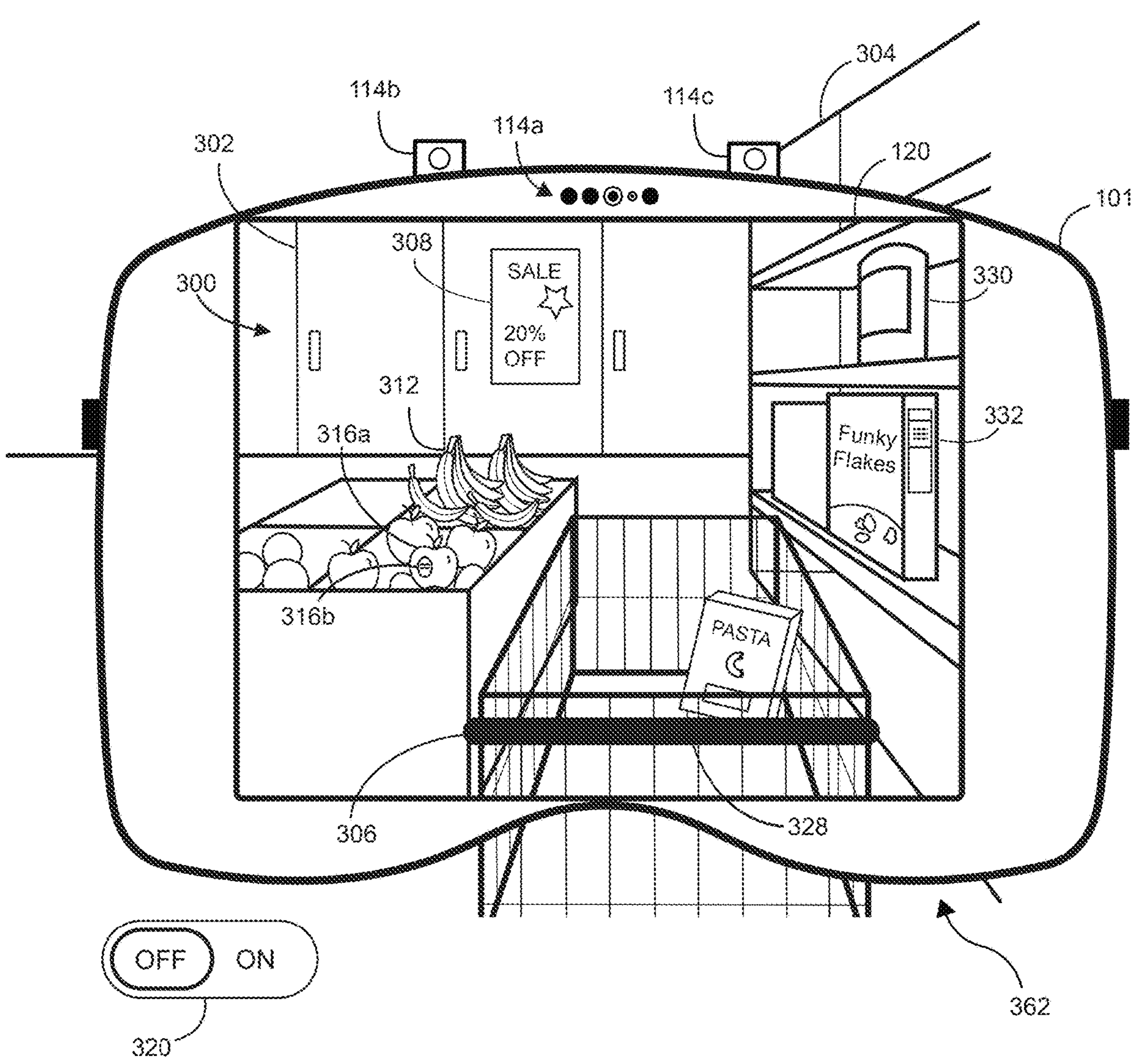
FIGS. 3A-3I illustrate calculating and presenting a representation of a score corresponding to one or more physical objects detected in the three-dimensional environment according to some examples of the disclosure.

FIG. 3A illustrates an electronic device 101 presenting, via a display 120, a three-dimensional environment 300 from a viewpoint of a user of the electronic device 101 (e.g., facing marketplace freezers 302 located along a back wall of a physical marketplace in which electronic device 101 is located). In some examples, a viewpoint of a user determines what content (e.g., physical and/or virtual objects) is visible in a viewport (e.g., a view of the three-dimensional environment 300 visible to the user via one or more display(s) 120, a display or a pair of display modules that provide stereoscopic content to different eyes of the same user). In some examples, the (virtual) viewport has a viewport boundary that defines an extent of the three-dimensional environment 300 that is visible to the user via the display 120 in FIGS. 3A-3I. In some examples, the region defined by the viewport boundary is smaller than a range of vision of the user in one or more dimensions (e.g., based on the range of vision of the user, size, optical properties or other physical characteristics of the one or more displays, and/or the location and/or orientation of the one or more displays relative to the eyes of the user). In some examples, the region defined by the viewport boundary is larger than a range of vision of the user in one or more dimensions (e.g., based on the range of vision of the user, size, optical properties or other physical characteristics of the one or more displays, and/or the location and/or orientation of the one or more displays relative to the eyes of the user). The viewport and viewport boundary typically move as the one or more displays move (e.g., moving with a head of the user for a head mounted device or moving with a hand of a user for a handheld device such as a tablet or smartphone). A viewpoint of a user determines what content is visible in the viewport. A viewpoint generally specifies a location and a direction relative to the three-dimensional environment, and as the viewpoint shifts, the view of the three-dimensional environment will also shift in the viewport. For a head mounted device, a viewpoint is typically based on a location and direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include displays with video passthrough, portions of the physical environment that are visible (e.g., displayed, and/or projected) via the one or more displays are based on a field of view of one or more cameras in communication with the displays which typically move with the displays (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more displays is updated based on the viewpoint of the user (e.g., displayed positions and poses of the virtual objects are updated based on the movement of the viewpoint of the user)). For displays with optical see-through, portions of the physical environment that are visible (e.g., optically visible through one or more partially or fully transparent portions of the display generation component) via the one or more displays are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the displays moves (and the appearance of one or more virtual objects is updated based on the viewpoint of the user).

In FIG. 3A, the electronic device 101 includes a display 120 and a plurality of image sensors **114*a* as described above that are controlled by the electronic device 101 to capture one or more images of a user or a part of the user (e.g., one or more hands of the user) while the user interacts with the electronic device 101. In some examples, virtual objects, virtual content, and/or user interfaces illustrated and described below could also be implemented on a head-mounted display that includes a display or display generation component that displays the virtual objects, virtual content, user interfaces or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user). The figures herein illustrate a three-dimensional environment that is presented to the user by electronic device 101 (e.g., and displayed by the display 120 of electronic device 101). In some examples, electronic device 101 may be similar to device 101 in FIG. 1, or device 201 in FIG. 2**, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively.

As shown in FIG. 3A, the electronic device 101 captures (e.g., using external image sensors 114*b* and 114*c*) one or more images of a physical environment 362 around electronic device 101, including one or more objects (e.g., shelf 304, freezers 302, a poster 308, shopping container 306 (e.g., a shopping cart), and consumable objects 330, 332, 328, 312, and 316*a*) in the physical environment 362 around the electronic device 101. In some examples, the electronic device 101 displays representations of the physical environment 362 in the three-dimensional environment or portions of the physical environment 362 are visible via the display 120 of electronic device 101. For example, the three-dimensional environment 300 includes consumable objects 330, 332, 328, 312, and 316*a*, poster 308, and portions of the shelf 304, freezers 302, and shopping container 306 in the physical environment 362.

In some examples, to present a representation of a score corresponding to one or more physical objects captured in the three-dimensional environment, the electronic device 101 initially detects one or more images of the physical environment 362 around electronic device 101. In some examples, the electronic device 101 detects, using one or more input devices (e.g., external image sensors 114*b* and 114*c*) a shopping container or other container to transport food items and/or merchandise in the three-dimensional environment. In some examples, prior to detecting the shopping container, the electronic device 101 determines that one or more first criteria are satisfied, including a criterion that is satisfied when a location of the electronic device 101 corresponds to a physical marketplace (e.g., grocery store, shopping center, outdoor market, or other location where users may purchase food and/or goods). In some examples, in accordance with a determination that the one or more first criteria is not satisfied (e.g., the location of the electronic device 101 does not correspond to a physical marketplace), the electronic device 101 does not detect one or more images of a physical environment 362 around electronic device 101. In addition to foregoing detecting one or more images of the physical environment 362 around electronic device 101, the electronic device 101 does not initiate a scoring mode, as indicated by scoring mode indicator 320 with value "OFF" in FIG. 3A. As will be described with reference to FIGS. 3B-3I, the scoring mode is an operating mode of the electronic device 101 in which the electronic device 101 controls the one or more input devices (e.g., image sensors 114*a*, 114*b*, and/or 114*c*) to continuously or semi-continuously detect for physical objects, such as consumable objects 330, 332, 328, 312, and 316*a* being placed within a shopping container, such as shopping container 306. In some examples, and as will be described below, in response to detecting one or more physical objects being placed within the shopping container 306, the electronic device 101 generates a representation of a score of the shopping container in the three-dimensional environment 300, wherein the score of the shopping container is based on the one or more physical objects in the shopping container. In some examples, detecting one or more physical objects including shopping container 306 may include various types of machine or computer vision analysis, OCR, and/or pattern recognition techniques of the one or more images of the physical environment 362 around electronic device 101 to detect the one or more physical objects including shopping container 306.

In some examples, the scoring mode is an operating mode of the electronic device 101 in which the electronic device 101 controls the one or more input devices (e.g., image sensors 114*a*, 114*b*, and/or 114*c*) to continuously or semi-continuously detect for user interaction with the three-dimensional environment 300 including the physical environment 362 and physical objects and/or virtual objects in the three-dimensional environment 300. For example, in response to detecting user interaction or engagement with a particular physical object, the electronic device 101 generates a representation of a respective score corresponding to the particular physical object. In some examples, user interaction includes: a gaze of the user; a finger of a hand and/or the hand touching, grabbing, holding a physical object; a finger of the hand directed to or within a threshold distance (e.g., 0, 1, 2, 3, 5, 10, 15, 20, 25, 30, or 50 cm) from a location corresponding to a virtual object; a finger of the hand touching physical buttons of the electronic device 101; a contact on a touch-sensitive surface; actuation of a physical input device; a predefined gesture, such as a pinch gesture or air tap gesture; and/or a voice input from the user of the electronic device 101.

Figure 3B:
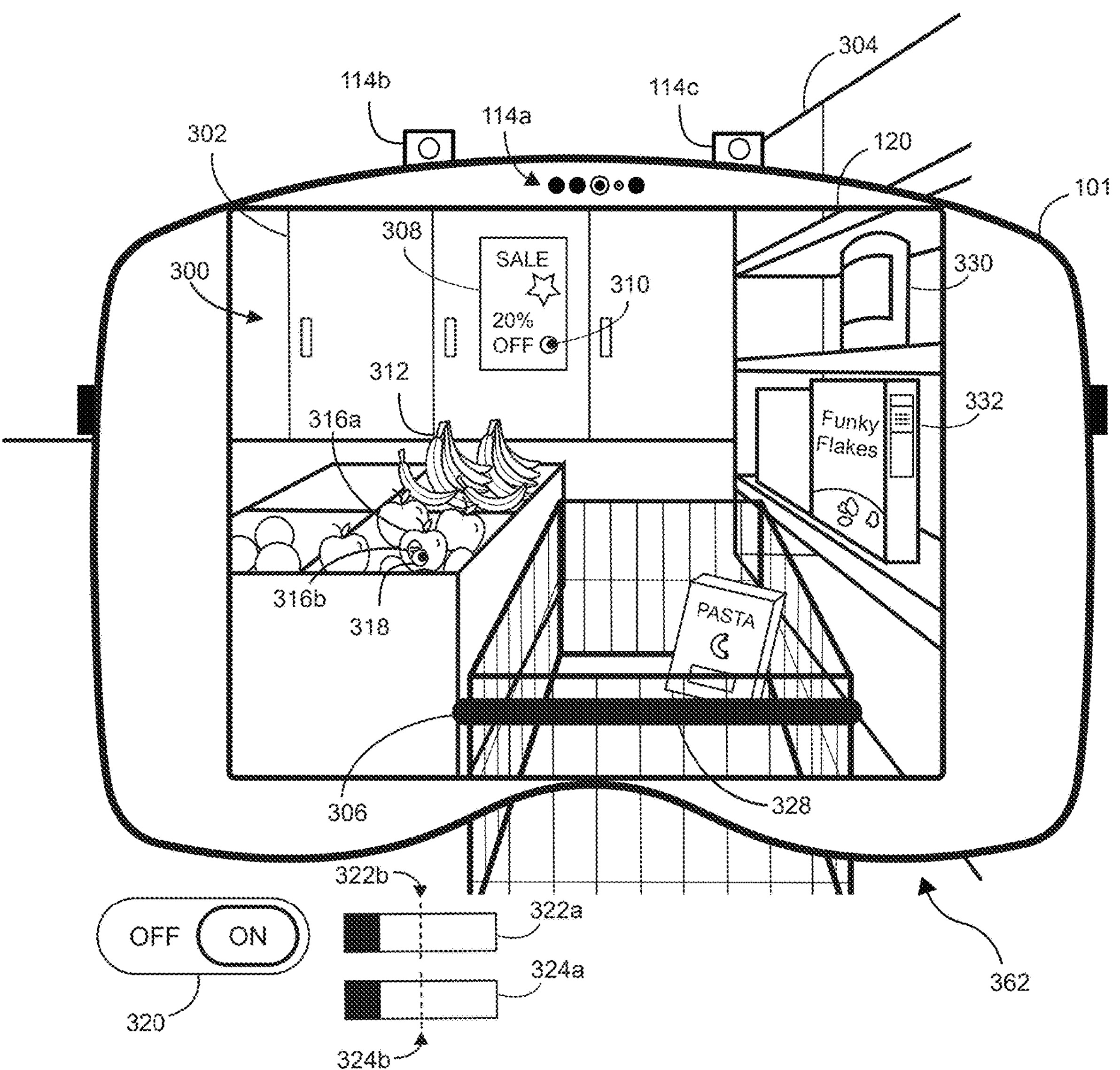

In FIG. 3B, the electronic device 101 initiates a scoring mode, as indicated by scoring mode indicator 320 with value "ON", in response to the electronic device 101 detecting, using one or more input devices (e.g., external image sensors 114*b* and 114*c*) shopping container 306 in the three-dimensional environment 300. In some examples, prior to initiating the scoring mode, the electronic device 101 determines that one or more first criteria are satisfied, including a criterion that is satisfied when the shopping container is within a predetermined distance (e.g., 0, 1, 3, 5, 10, 20, 30, 40, 50, 60, 70, 80, 90, 100, 125 or 150 cm) from a user of the electronic device 101. In some examples, the one or more criteria include a criterion that is satisfied when the electronic device 101 determines that the user of the electronic device is interacting with the shopping container 306 (e.g., pushing or carrying the shopping container 306 and/or placing one or more physical objects within the shopping container 306).

In some examples, the electronic device 101 may exit or cease to operate according to the scoring mode in response to receiving a request from the user of the electronic device 101 to cease operation according to the scoring mode. In some examples, the electronic device 101 may exit or cease to operate according to the scoring mode in accordance with a determination that the one or more first criteria is not satisfied (e.g., the current location of the electronic device 101 does not correspond to and/or no longer corresponds to a physical marketplace, the electronic device does not detect and/or no longer detects the shopping container 306 within the three-dimensional environment 300, the shopping container 306 is not within and/or is no longer within the predetermined distance from the user of the electronic device 101, the electronic device 101 detects that the user of the electronic device 101 is not pushing or carrying and/or is no longer pushing or carrying the shopping container 306, and/or the electronic device 101 detects that the user of the electronic device 101 is not placing and/or is no longer placing objects within the shopping container 306). In some examples, the electronic device 101 may exit or cease to operate according to the scoring mode in response to a determination that all of the one or more first criteria described above are not satisfied or a subset of the one or more first criteria is not satisfied (e.g., the shopping container 306 is not within the predetermined distance from the user of the electronic device 101 and the electronic device 101 detects that the user of the electronic device 101 is not pushing or carrying the shopping container 306).

In some examples, while in the scoring mode as shown in FIG. 3B, the electronic device 101 detects, via one or more input devices (e.g., image sensors 114*a*, 114*b*, and/or 114*c*), that gaze of the user of the electronic device 101 is directed towards a physical object or a virtual object in the three-dimensional environment 300. For example, FIG. 3B illustrates gaze 310 of the user directed towards poster 308 and gaze 318 of the user directed towards consumable object 316*a* (e.g., an apple). While FIG. 3B (and FIG. 3C) illustrates multiple concurrent gaze inputs directed to objects in three-dimensional environment 300, it is understood that such gaze inputs are optionally alternative inputs, and not concurrent inputs. Further, FIG. 3B illustrates gaze duration indication 322*a* that is associated with consumable object 316*a* and is used to indicate the amount of time that the gaze 318 of the user is directed towards consumable object 316*a*. For example, FIG. 3B illustrates gaze duration indication 322*a* is below time threshold 322*b*, which indicates that a period of time the gaze 318 of the user has been directed towards consumable object 316*a* is than the amount of time required to display a representation of a score for consumable object 316*a*. Further, FIG. 3B also shows gaze duration indication 324*a* that is associated with poster 308 and is used to indicate the amount of time that the gaze 310 of the user is directed towards poster 308. For example, FIG. 3B illustrates gaze duration indication 324*a* is below time threshold 324*b*, which indicates that a period of time the gaze 310 of the user has been directed towards poster 308 is less than the amount of time required to display a representation of a score for poster 308. However, in some examples, the electronic device does not display representations of respective scores for objects other than consumable objects (e.g., objects that do not satisfy the one or more first criteria including the criterion that is satisfied when the object corresponds to a consumable object). In some examples, consumable objects include food items, drink items, supplements, medication, and/or other substances which may be consumed by the user.

Figure 3C:
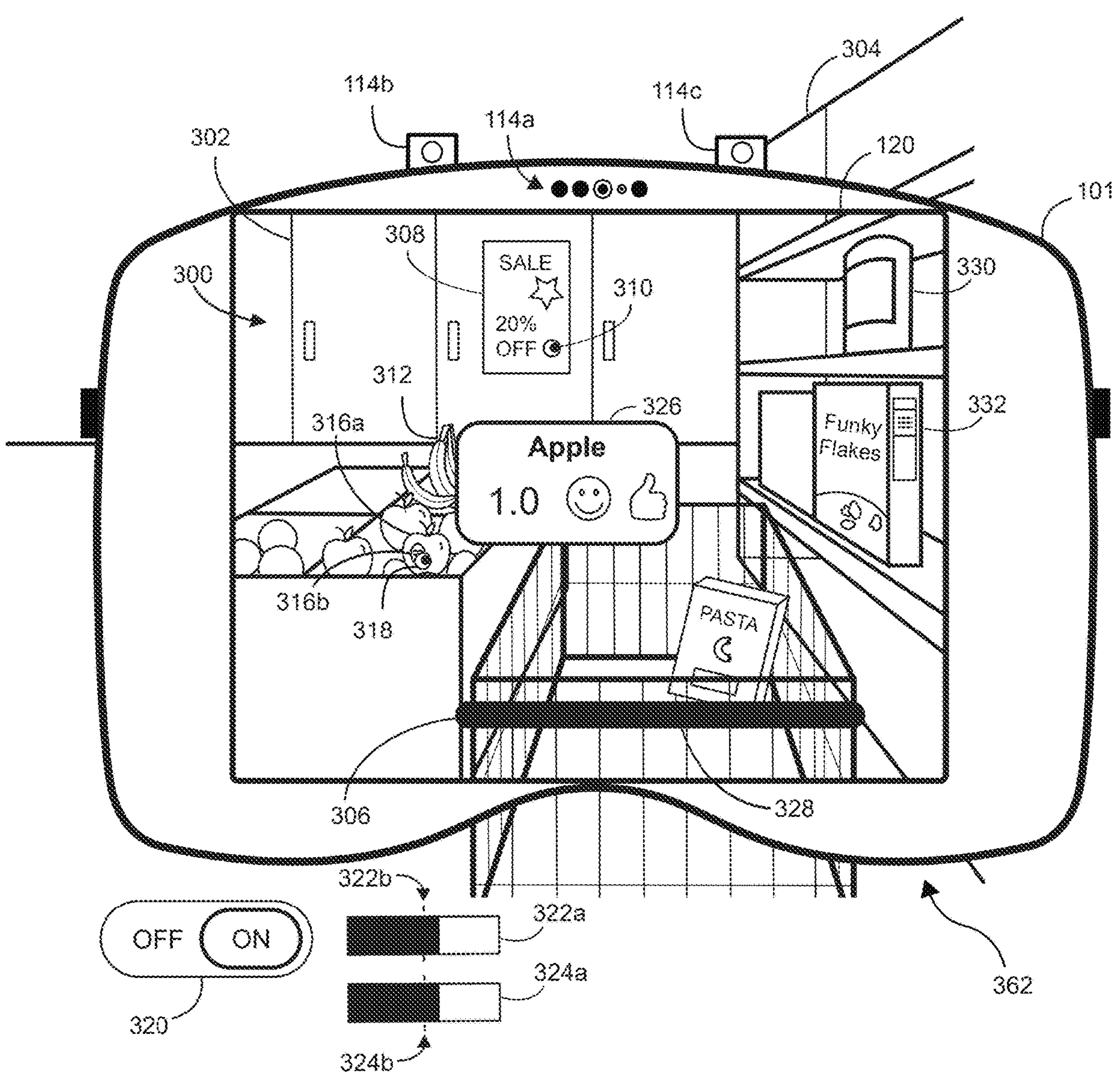

In some examples, the electronic device displays a representation of a score for a consumable object in response to gaze of the user being directed towards the consumable object. For example, from FIG. 3B to FIG. 3C, the electronic device 101 detects that the gaze 318 of the user is directed toward consumable object 316*a* for a period of time greater than a time threshold 322*b*. In response, the electronic device 101 presents, via the display 120, a representation of a score (e.g., representation 326) corresponding to the first object in the three-dimensional environment 300. In some examples, the representation 326 includes the nutritional score for the consumable object 316*a* and information (e.g., content, graphics, and/or metadata) about the consumable object 316*a*. In some examples, the representation 326 is selectable to display detailed information about the consumable object 316*a*. In some examples, the representation 326 is selectable to navigate to a user interface element of an application associated with the nutritional score (e.g., webpage of NOVA classification). In some examples, displaying the representation 326 includes outputting an audible description of the nutritional score. FIG. 3C also illustrates that the electronic device 101 foregoes presenting, via the display 120, a representation of a score corresponding to the poster 308 even when the electronic device 101 detects that the gaze 310 of the user is directed toward the poster 308 for a period of time greater than time threshold 324*b*. In some examples, the electronic device 101 does not present a representation of a score corresponding to the poster 308 because the poster 308 is not a consumable object.

Figure 3D:
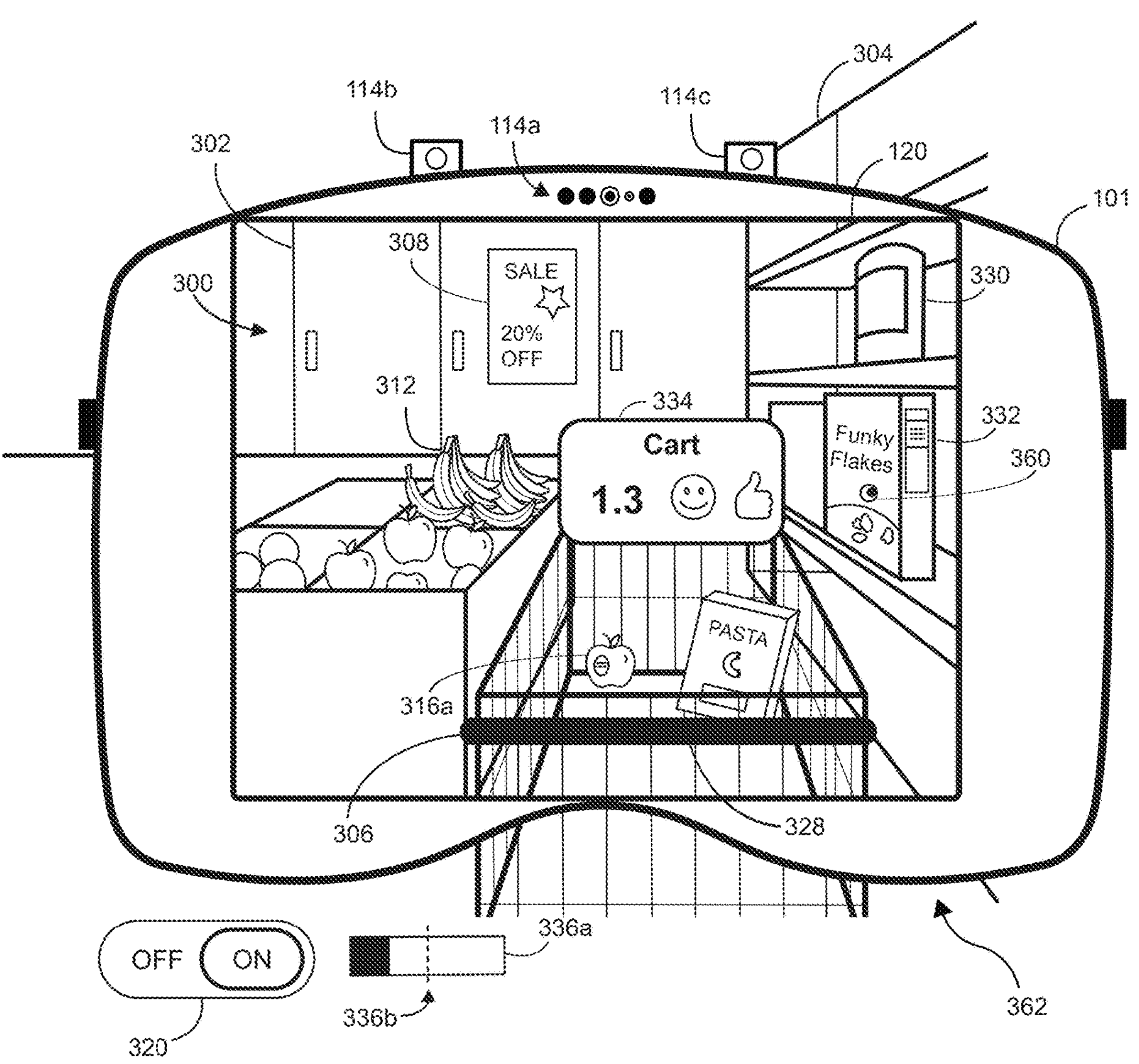
Figure 3E:
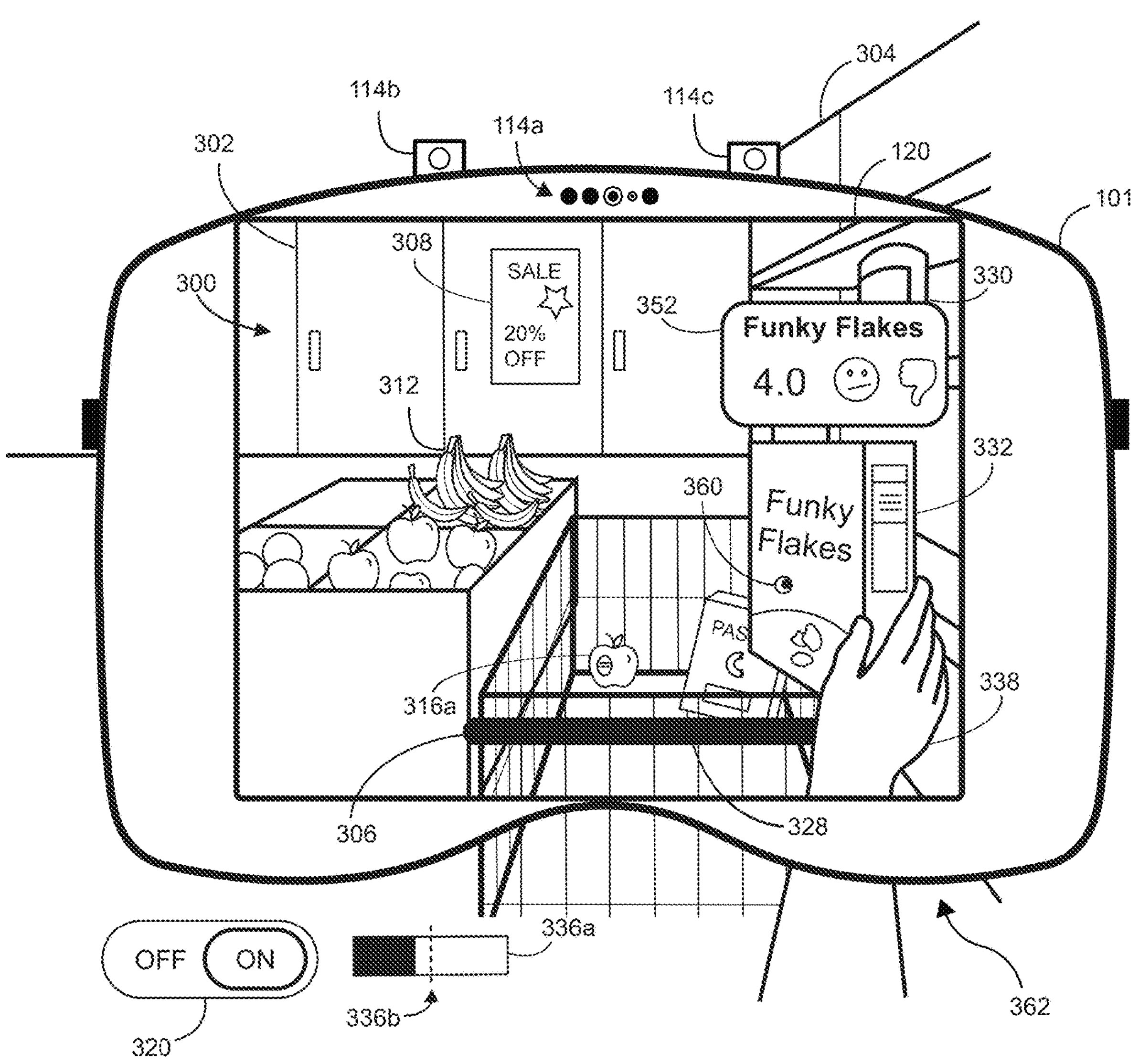

In some examples, the electronic device 101 ceases to display representation 326 corresponding to the consumable object 316*a* in response to the electronic device 101 detecting that the gaze 318 of the user moved away from consumable object 316*a* as shown from FIG. 3C to FIG. 3D. If the electronic device 101 detects that the gaze 318 of the user is moved back to being directed towards consumable object 316*a*, the electronic device 101 optionally redisplays the representation 326, as shown in FIG. 3C. In some examples, the electronic device 101 ceases to display representation 326 in response to user interaction (as described above) corresponding to a request to remove the display of representation 326. In some examples, the representation 326 is displayed at a first location within the three-dimensional environment 300 that is within a threshold distance (e.g., 5, 10, 15, 20, 25, 30, 50, or 100 cm) from the consumable object 316*a* as shown in FIG. 3C.

In some examples, presenting, via the display 120, representation 326 corresponding to consumable object 316*a* includes applying computer vision processing, OCR, or other recognition techniques to detect and/or classify consumable object 316*a*. For example, in at least FIGS. 3A-3C, consumable object 316*a* includes OCR decodable text characters 316*b*, a bar code symbol, a QR code, or any other form of presenting information that can be imaged by a camera of the electronic device and analyzed using computer-implemented algorithms to extract information. In some examples, the electronic device 101 transmits information associated with the OCR decodable text characters 316*b* for look-up in a remote server/database and/or local database (e.g., maintained by electronic device 101 from an application operating on the electronic device 101 and/or by a third-party in communication with the electronic device 101) to retrieve the nutritional score including the nutritional score for the consumable object 316*a* and information (e.g., content, graphics, and/or metadata) about the consumable object 316*a*. In some examples, the nutritional score including the nutritional score for the consumable object 316*a* and information (e.g., content, graphics, and/or metadata) about the consumable object 316*a* is received and/or derived from a web browsing application or another application other than the application operating on the electronic device. In some examples, the electronic device 101 may look up, in the above-mentioned databases, a nutrition goal previously setup by a user that includes a particular total nutrition score. In some examples and as will be described below with reference to FIG. 3F, the electronic device 101 may utilize the nutrition goal when recommending consumable objects to be added to the shopping container 306.

In some examples and as shown in FIG. 3D, the electronic device 101 presents, via the display 120, a representation of a score (e.g., representation 334) of the shopping container 306 in the three-dimensional environment 300. In some examples, the score of the shopping container is calculated based on a plurality of objects in the shopping container, such as consumable objects 316*a* and 328. For example, from FIG. 3C to FIG. 3D, the electronic device 101 detects movement of consumable object 316*a* from outside the shopping container 306 to within the shopping container 306. In response to detecting movement of consumable object 316*a* from outside the shopping container 306 to within the shopping container 306, the electronic device 101 presents, via the display 120, representation 334 corresponding to consumable objects 316*a* and 328 located within shopping container 306. In some examples, representation 334 includes a total (e.g., cumulative or average) nutritional score associated with all objects within the shopping container 306. In some examples, representation 334 includes the total nutritional score for the shopping container 306 and information (e.g., content, graphics, and/or metadata) about the objects in the shopping container 306. In some examples, the representation 334 is selectable to display detailed information about the objects within shopping container 306 (e.g., consumable objects 316*a* and 328 in FIG. 3D). In some examples, the representation 334 is selectable to navigate to a user interface element of an application associated with the nutritional score (e.g., webpage of NOVA classification). In some examples, displaying the representation 334 includes outputting an audible description of the total nutritional score. In some examples, the representation 334 is displayed at a respective location within the three-dimensional environment 300 that is within a threshold distance (e.g., such as the threshold distance above) from the shopping container 306 as shown in FIG. 3D.

In some examples, the electronic device 101 may update representation 334 in response to detecting movement of an object from outside the shopping container 306 to within the shopping container 306. In some examples, updating representation 334 includes redetermining the total nutritional score based on the plurality of objects in the shopping container 306 including the object moved to within the shopping container 306. In some examples, prior to updating representation 334, the electronic device 101 determines that the object moved to within the shopping container 306 satisfies one or more second criteria. In some examples, the one or more second criteria are the same as the one or more first criteria. For example, the one or more second criteria include a criterion that is satisfied when the object moved to within the shopping container 306 corresponds to a consumable object.

In some examples, the electronic device 101 may update representation 334 in response to detecting movement of the first object from within the shopping container 306 to outside the shopping container 306. In some examples, updating representation 334 includes redetermining the total nutritional score based on the plurality of objects in the shopping container 306 without the first object. In some examples, if the object moved to outside the shopping container 306 corresponds to an object that is not a consumable object, the electronic device 101 does not update the representation 334 and accordingly does not redetermine the total nutritional score. In some examples, updating the representation 334 includes outputting an audible description of the redetermined total nutritional score. In some examples, updating representation 334 includes visually emphasizing representation 334 relative to other representations displayed (e.g., concurrently with representation 334), such as changing a color and/or size of representation 334.

In some examples, the electronic device 101 ceases to display representation 334 in response to the electronic device 101 detecting that the gaze of the user is not directed towards shopping container 306 and/or representation 334. If the electronic device 101 detects that the gaze of the user is changed back to being directed towards shopping container 306, the electronic device 101 optionally redisplays the representation 334, as shown in FIG. 3D. In some examples, the electronic device 101 ceases to display representation 334 in response to user interaction (as described above) corresponding to a request to remove the display of representation 334.

In some examples, if electronic device detects a user interaction (as described above) while the gaze of the user of electronic device 101 is directed towards an object in the three-dimensional environment, the electronic device 101 displays a representation of a score corresponding to the object. For example, in FIG. 3E, the electronic device 101 detects a user interaction input (e.g., hand of the user of the electronic device 101 touching, grabbing, holding consumable object 332) before the gaze 360 of the user satisfies the one or more criteria including a criterion that is satisfied when the gaze 360 of the user is directed towards the consumable object 332 (e.g., cereal box) for more than time threshold 336*b* as indicated by gaze duration indicator 336*a* (e.g., before the duration of the gaze 360 directed towards consumable object 332 reaches threshold 336*b* as shown by gaze duration indicator 336*a*). In response to detecting the user interaction input before the gaze 360 satisfies the one or more criteria (e.g., before reaching threshold 336*b*), the electronic device 101 presents, via the display 120, the representation 352 of a score corresponding to consumable object 332 in the three-dimensional environment 300. In some examples, the electronic device 101 displays representation 352 in response to detecting user interaction input including physical contact between consumable object 332 and the user irrespective of the location of the gaze (e.g., without detecting the gaze 360 of the user directed towards consumable object 332). In some examples, representation 352 includes one or more characteristics of representations 326 and/or 334 described above.

Figure 3F:
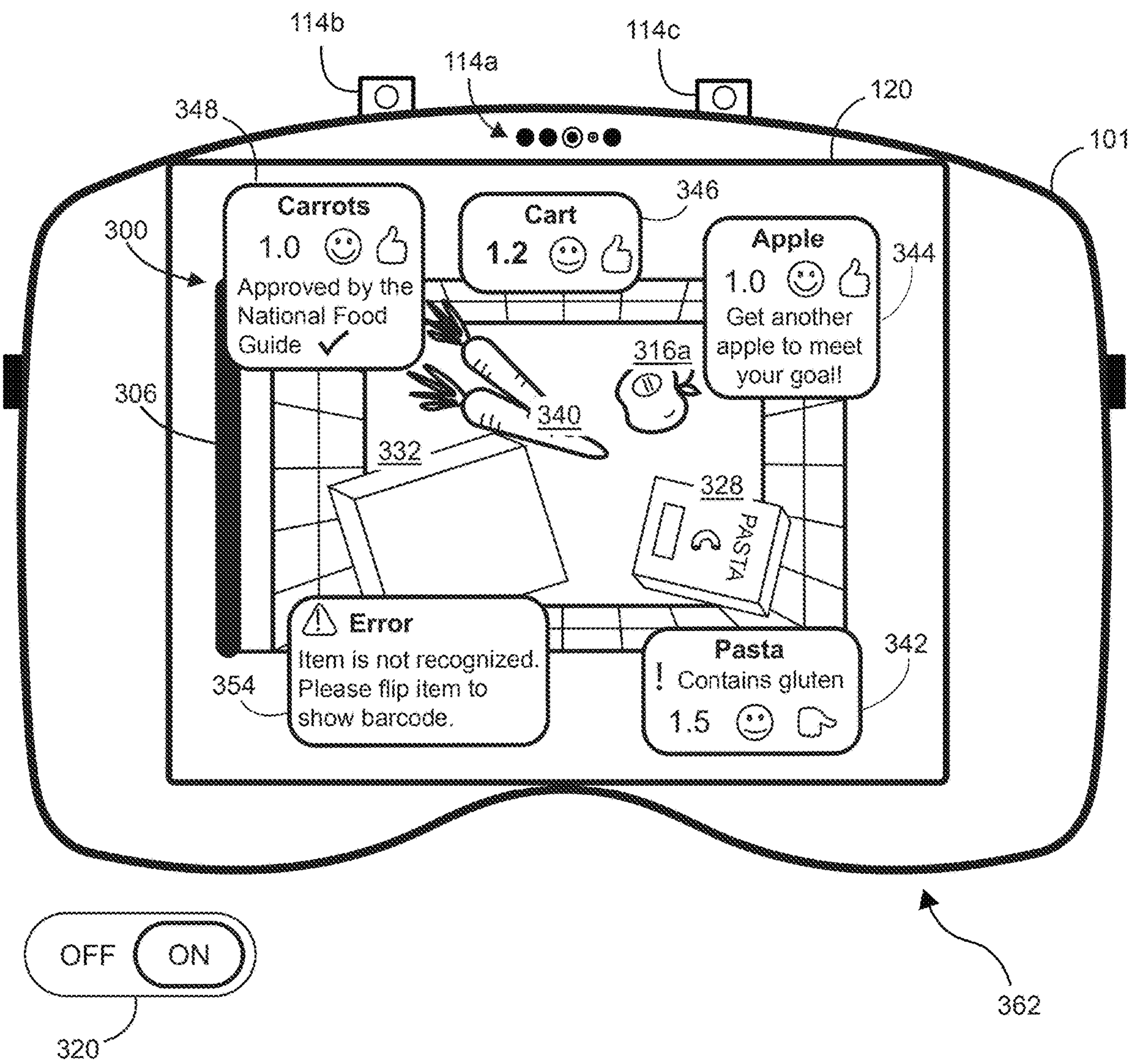

In some examples, the electronic device 101 concurrently displays a plurality of representations of scores corresponding to respective objects and a representation of a score of the shopping container in the three-dimensional environment. For example, in FIG. 3F, the electronic device 101 detects a change of an orientation of the electronic device 101 relative to the shopping container 306 that satisfies one or more criteria. For example, the one or more criteria includes a criterion that is satisfied when the change of the orientation of the electronic device 101 corresponds to the user of the electronic device 101 hovering over shopping container 306 and/or looking down at the shopping container 306. In response to detecting the change in the orientation of the electronic device 101 satisfying the one or more criteria (e.g., detecting the viewpoint of the user looking down at the shopping container 306, as shown in FIG. 3F), the electronic device 101 displays, via display 102, respective representations of scores corresponding to the objects within the shopping container 306 and/or a representation of a score of the shopping container. For example, in FIG. 3F, display 102 includes: representation 348 corresponding to consumable object 340 (e.g., carrots); representation 344 corresponding to consumable object 316*a* (e.g., an apple); representation 342 corresponding to consumable object 328 (e.g., pasta); and representation 346 corresponding to a score of the shopping container 306 that is based on all the detected consumable objects within the shopping container (e.g., consumable objects 340, 316*a*, and 328).

In some examples, the electronic device 101 displays the plurality of representations of scores corresponding to respective objects and the representation of the score of the shopping container from other viewpoints other than the viewpoint of the user looking down at the shopping container 306. In some examples, the electronic device 101 displays the plurality of representations of scores corresponding to respective objects and the representation of the score of the shopping container in response to user interaction (as described above) corresponding to a request to display the plurality of representations of scores corresponding to respective objects and the representation of the score of the shopping container. In some examples, representation 346 includes one or more characteristics of representation 334 described above. In some examples, representations 348, 344, and 342 include one or more characteristics of representation 326 described above.

In some examples, the electronic device 101 displays one or more representations of content associated with one or more of the plurality of objects in the shopping container 306 (e.g., additional content associated with the one or more consumable objects within the shopping container) optionally in response to the change of orientation of the electronic device 101 relative to the shopping container 306 that satisfies one or more criteria as described above. For example, in FIG. 3F, representation 348 includes content related to the source or provider of the score (e.g., "National Food Guide"). In another example, representation 344 includes content related to a recommendation or suggestion to positively influence the score of the shopping container and/or meet a total nutrition score set by the user (e.g., "Get another apple to meet your goal"). In some examples, the electronic device 101 may suggest other consumable objects, different from the consumable objects in shopping container 306 based on the total nutrition score set by the user. In some examples, the suggested consumable objects have respective nutrition scores that meet or improve the total nutrition score set by the user. For example, representation 344 optionally includes an indication of a second object, different from consumable object 316*a*, associated with a respective score that is within (or beyond or meets) a threshold of the score corresponding to consumable object 316*a*. In some examples, the second object is associated with a score that is similar to the score associated with consumable object 316. In this case, the electronic device 101 optionally provides recommendations of other consumable objects with similar scores that are different from consumable object 316*a*. In another example, representation 344 optionally includes an indication of a second object, different from consumable object 316*a*, associated with a respective score that is greater than (or less than or equal to) the score corresponding to consumable object 316*a*. In this case, the electronic device 101 optionally recommends a second object associated with a respective score that is determined to meet or improve the total nutrition score set by the user compared to the respective score associated with consumable object 316*a*. In another example, representation 342 includes content related to an indication of a warning or alert that the consumable object 328 (e.g., pasta) is associated with an intolerance or a food allergy (e.g., "Contains gluten"). In some examples, representation 342 may include content related to a recommended alternative or replacement for consumable object 328.

In some examples, the electronic device 101 displays an indication that an object in the shopping container does not satisfy the one or more criteria described herein. For example, the electronic device 101 displays an indication that the object is not a consumable object. In another example, the indication may inform the user that the object was not recognized by electronic device 101 (e.g., OCR decodable text characters, a bar code symbol, a QR code, or any other form of presenting information was not decoded). For example, in FIG. 3F, the electronic device 101 does not recognize and/or cannot scan object 332. In accordance with the electronic device 101 being unable to recognize and/or scan object 332, the electronic device 101 displays representation 354 indicating that the electronic device 101 is unable to recognize and/or scan object 332 (e.g., "Item is not recognized. Please flip item to show barcode.").

Figure 3G:
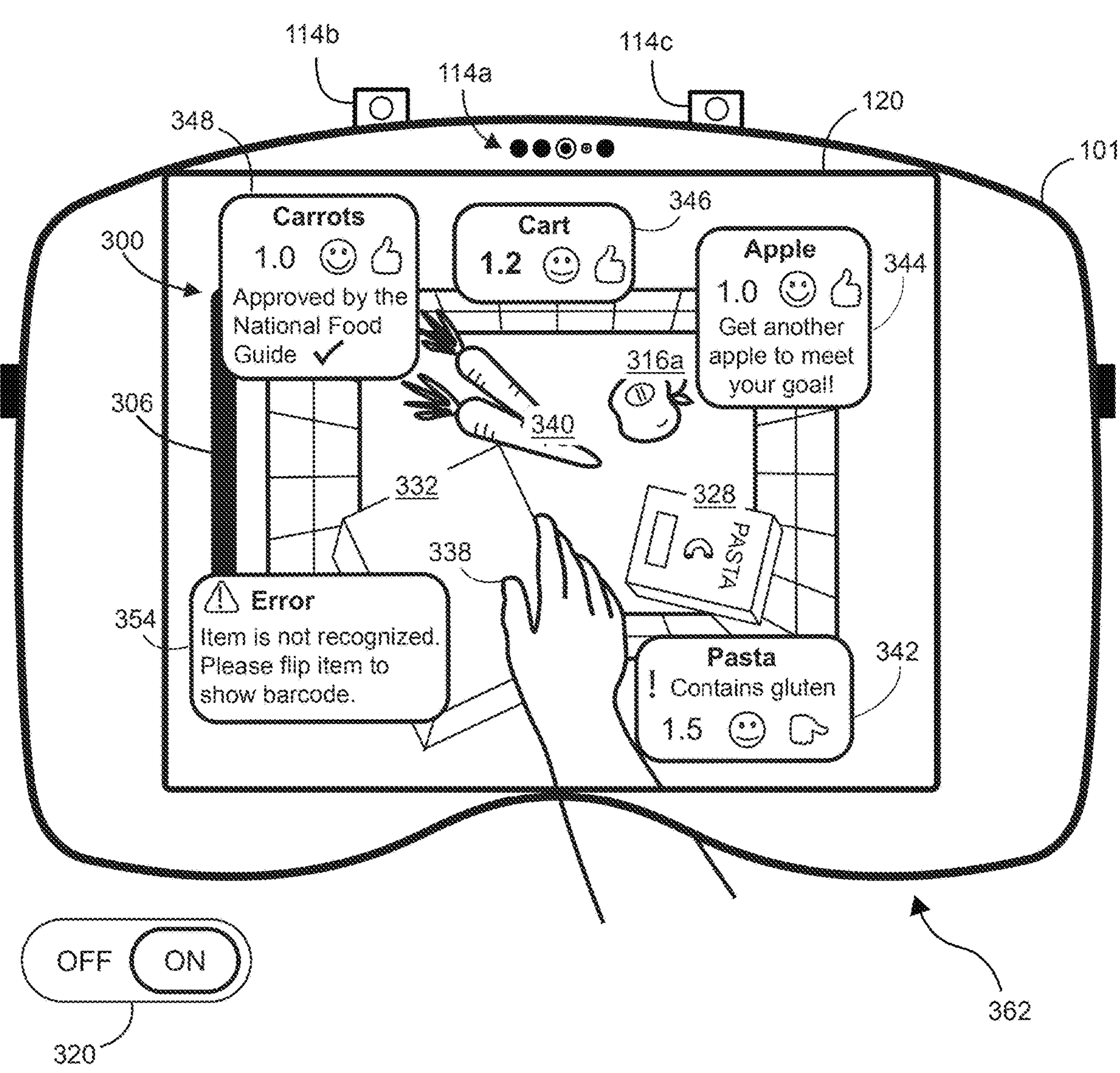
Figure 3H:
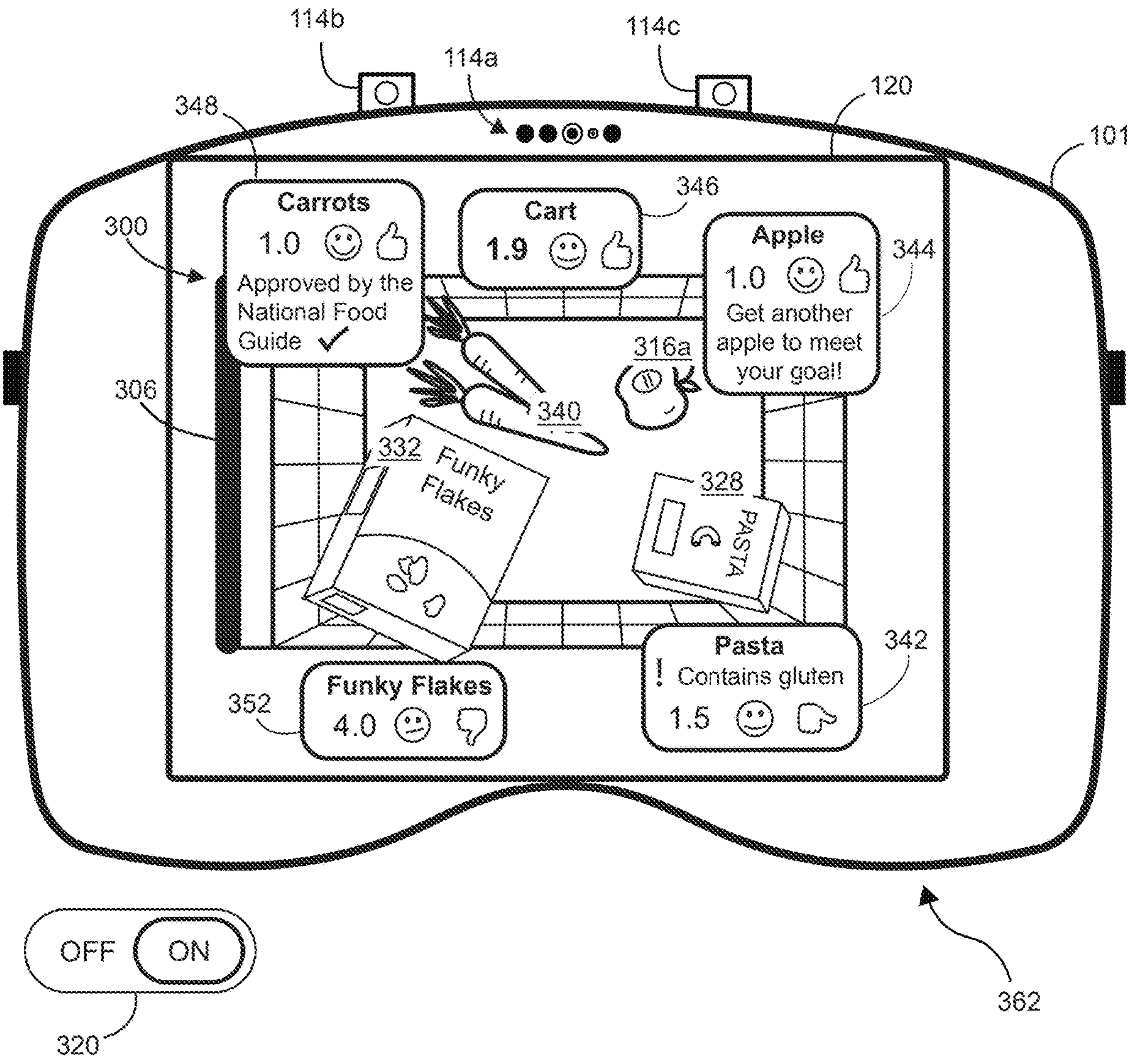
Figure 3I:
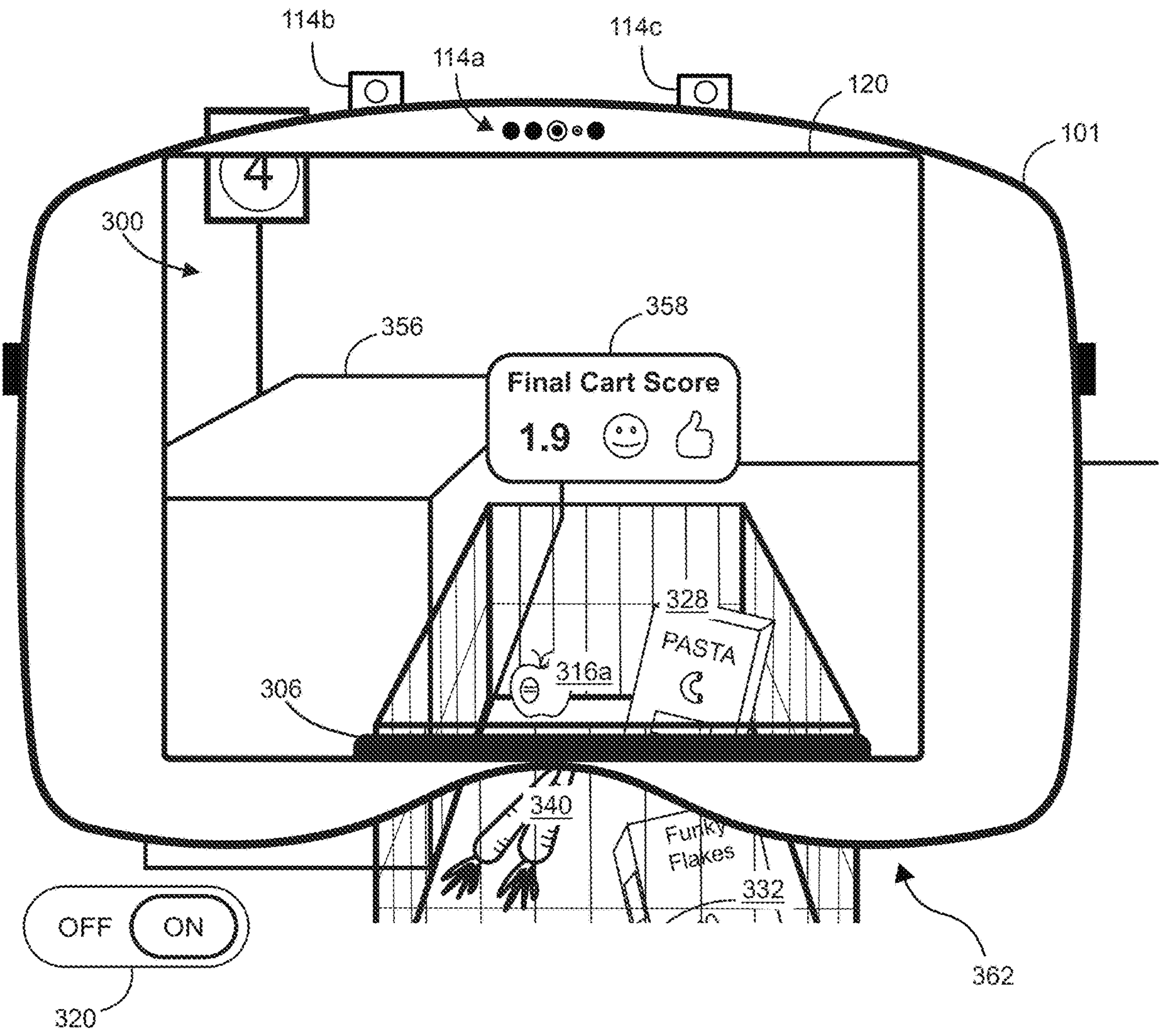

In some examples, and as shown in FIG. 3G, the electronic device 101 detects user interaction 338 (as described above) corresponding to turning the object 332 over such that a front surface of the object 332 is facing the user of the electronic device 101, as shown in FIG. 3H. The front surface of object 332 includes text characters recognizable by the electronic device 101, as shown in FIG. 3H. In response to the electronic device 101 recognizing object 332, the electronic device 101 displays a representation 352 corresponding to object 332 in FIG. 3H. In some examples, representation 352 includes one or more characteristics of representation 326 described above. In some examples, in response to the electronic device 101 recognizing object 332, the electronic device 101 updates representation 346 in FIG. 3H. In some examples, updating representation 346 includes redetermining the score of the shopping container 306 based on the plurality of objects in the shopping container 306 including the object 332. In some examples, updated representation 346 includes one or more characteristics of representation 334 described above.

In some examples, the electronic device 101 detects that the user of the electronic device 101 is initiating an action indicative of purchasing the plurality of objects in shopping container 306. For example, in FIG. 3I, the electronic device 101 detects a change in contextual information of the physical environment 362 indicating that the current location of the electronic device 101 corresponds to a checkout area 356 in the physical environment 362 at which the user of the electronic device 101 may purchase the plurality of objects in shopping container 306. In some examples, in response to detecting that the location of the electronic device 101 corresponds to the checkout area 356, the electronic device 101 displays representation 358 corresponding to the score of the shopping container 306. In some examples, displaying representation 358 may serve as a final check of the plurality of items in shopping container 306 before initiating the purchase of the plurality of items in shopping container 306. In some examples, representation 358 includes one or more characteristics of representation 334 described above. In some examples, the electronic device 101 displays representation 358 in response to the electronic device detecting that the electronic device 101 is within a predetermined distance of the checkout area 356. In some examples, only representation 358 is displayed optionally prior to detecting that the location of the electronic device corresponds to the checkout area 356 and/or when the location of the electronic device corresponds to the checkout area 356 (e.g., other representations are not displayed by the electronic device 101). In some examples, the electronic device 101 ceases to display representation 358 in accordance with a determination that the user has completed the action of purchasing the plurality of items in shopping container 306 (e.g., shopping container 306 no longer includes the plurality of items). Additionally or alternatively, the electronic device 101 optionally ceases to display representation 358 in accordance with a determination that the location of the user no longer corresponds to the checkout area 356 and/or the physical marketplace.

In some examples, the one or more representations described herein are displayed in applications such as health applications. In some examples, the one or more representations are selectable via user interaction as described above to display detailed information about respective scores via a second electronic device, different from the electronic device 101. For example, the second electronic device is a mobile device (e.g., a tablet, a smartphone, a media player, or a wearable device), or a computer. In some examples, the scores of the representations described herein are calculated based on various factors, such as, for example, whether the plurality of objects in the shopping container are organic, sustainable, include specific food allergies, or another scoring factor, such as based on the objects' place of origin.

Figure 4:
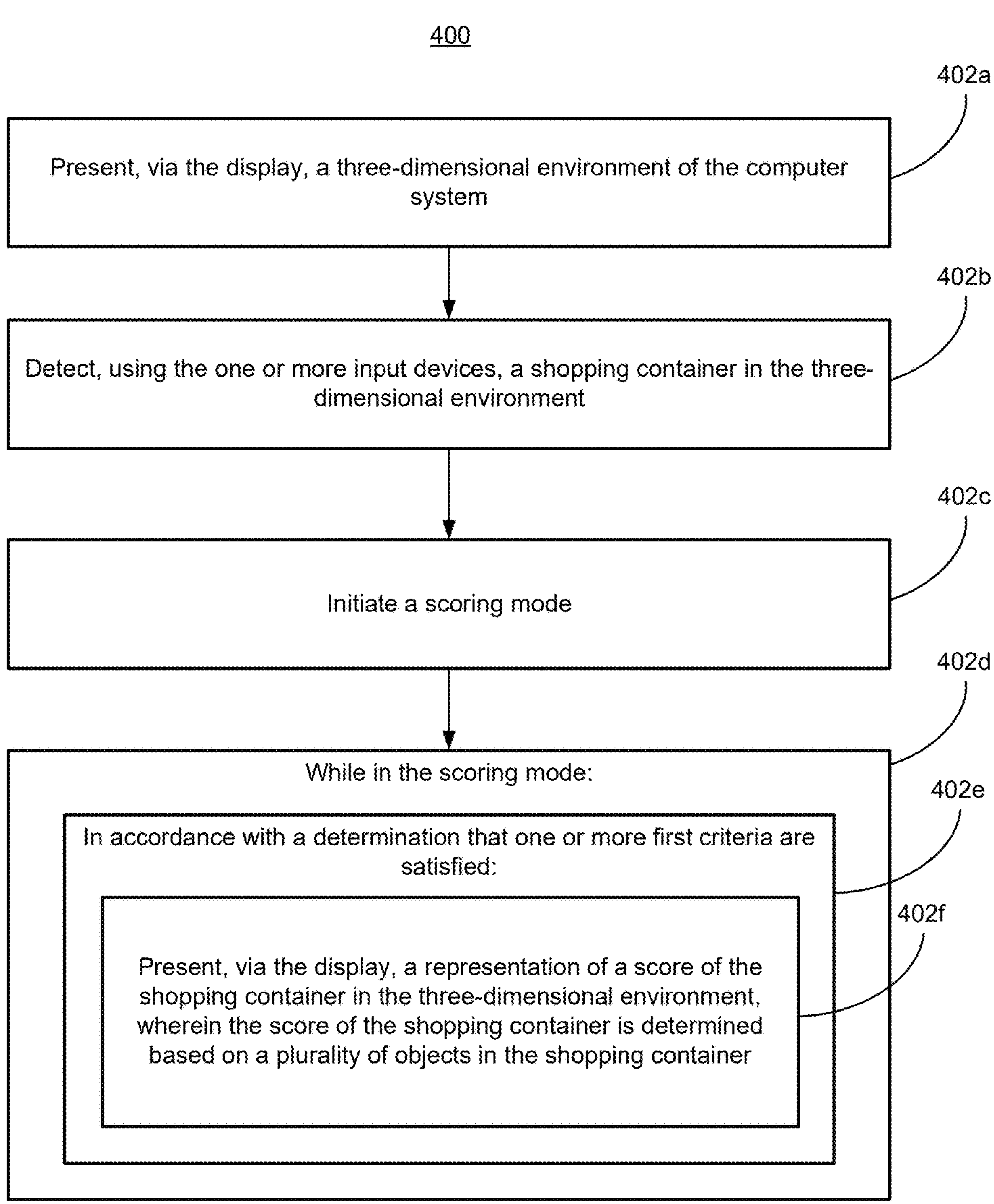
FIG. 4 illustrates a flow diagram illustrating an example process for calculating and presenting a representation of a score corresponding to one or more physical objects detected in the three-dimensional environment according to some examples of the disclosure.

FIG. 4 illustrates a flow diagram illustrating an example process for calculating and presenting a representation of a score corresponding to one or more physical objects detected in the three-dimensional environment according to some examples of the disclosure. In some examples, process 400 begins at an electronic device in communication with a display and one or more input devices. In some examples, the electronic device is optionally a head-mounted display similar or corresponding to device 201 of FIG. 2. As shown in FIG. 4, in some examples, at 402*a*, the electronic device presents, via the display, a three-dimensional environment of the electronic device. For example, the electronic device (e.g., electronic device 101 in FIG. 3A) presents a three-dimensional environment, such as three-dimensional environment 300. In some examples, at 402*b*, the electronic device detects, using the one or more input devices, a shopping container in the three-dimensional environment, such as shopping container 306 in FIG. 3B. In some examples, at 402*c*, the electronic device initiates a scoring mode. For example, as shown in FIG. 3B, the initiation of the scoring mode is represented by scoring mode indicator 320 with value "ON". In some examples, at 402*d*, while in the scoring mode, in accordance with a determination that one or more first criteria are satisfied (402*e*), the electronic device presents (402*f*), via the display, a representation of a score of the shopping container in the three-dimensional environment, wherein the score of the shopping container is calculated based on a plurality of objects in the shopping container. For example, in FIG. 3D, the electronic device 101 displays, via display 120, representation 334. Representation 334 optionally includes a score of the shopping container 306 that is based on consumable objects 316*a* and 328 in shopping container 306.

It is understood that process 400 is an example and that more, fewer, or different operations can be performed in the same or in a different order. Additionally, the operations in process 400 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising at an electronic device in communication with a display, and one or more input devices: presenting, via the display, a three-dimensional environment of the electronic device; detecting, using the one or more input devices, a shopping container in the three-dimensional environment; initiating a scoring mode; and while in the scoring mode: in accordance with a determination that one or more first criteria are satisfied: presenting, via the display, a representation of a score of the shopping container in the three-dimensional environment, wherein the score of the shopping container is calculated determined based on a plurality of objects in the shopping container.

Additionally or alternatively, in some examples, the one or more first criteria include a criterion that is satisfied when at least one object of the plurality of objects in the shopping container corresponds to a consumable object. Additionally or alternatively, in some examples, the one or more first criteria include a criterion that is satisfied when a location of the electronic device corresponds to a physical marketplace. Additionally or alternatively, in some examples, the plurality of objects in the shopping container are detected by the electronic device using optical character recognition (OCR) or computer vision. Additionally or alternatively, in some examples, the one or more first criteria include a criterion that is satisfied when the shopping container is within a predetermined distance from a user of the electronic device. Additionally or alternatively, in some examples, the method further comprises: while in the scoring mode, detecting via one or more input devices, that a gaze of a user of the electronic device is directed towards a first object; and in response to detecting that the gaze of the user is directed towards the first object: in accordance with a determination that the gaze of the user satisfies one or more second criteria including a criterion that is satisfied when the gaze of the user is directed towards the first object for more than a time threshold, presenting, via the display, a representation of a score corresponding to the first object in the three-dimensional environment; and in accordance with a determination that the gaze of the user does not satisfy the one or more second criteria, forgoing presenting, via the display, the representation of the score corresponding to the first object in the three-dimensional environment.

Additionally or alternatively, in some examples, the method further comprises: in accordance with a determination that an interaction input directed to the first object satisfies the one or more second criteria, the one or more second criteria including a criterion that is satisfied when the interaction input includes physical contact between the first object and a user, presenting, via the display, the representation of a score corresponding to the first object in the three-dimensional environment. Additionally or alternatively, in some examples, the method further comprises: while in the scoring mode, detecting via one or more input devices, movement of a first object from within the shopping container to outside the shopping container; and in response to detecting the movement of the first object from within the shopping container to outside the shopping container: updating the representation of the score of the shopping container in the three-dimensional environment, wherein the score of the shopping container is redetermined based on the plurality of objects in the shopping container without the first object.

Additionally or alternatively, in some examples, the one or more first criteria include a criterion that is satisfied when a change in contextual information indicates initiating a purchase of the plurality of objects in the shopping container. Additionally or alternatively, in some examples, the method further comprises: while a first object of the plurality of objects is associated with a first object score: in accordance with a determination that one or more second criteria are satisfied, presenting an indication of a second object, different from the first object, associated with a second score that is within a threshold of the first object score. Additionally or alternatively, in some examples, the method further comprises: while a first object of the plurality of objects is associated with a first object score: in accordance with a determination that one or more second criteria are satisfied, presenting an indication of a second object, different from the first object, associated with a second score that is greater than the first object score.

Additionally or alternatively, in some examples, the representation of the score of the shopping container is displayed at a first location that is within a threshold distance from the shopping container. Additionally or alternatively, in some examples, the method further comprises: while a first object of the plurality of objects is associated with a first object score: in accordance with a determination that one or more second criteria are satisfied, presenting, via the display, a representation of the first object score of the first object at a first location that is within a threshold distance from the first object. Additionally or alternatively, in some examples, the method further comprises: while in the scoring mode, detecting, via one or more input devices, movement of a first object from outside the shopping container to within the shopping container, wherein the first object satisfies one or more second criteria; and in response to detecting movement of the first object from outside the shopping container to within the shopping container: updating the representation of the score of the shopping container in the three-dimensional environment, wherein the score of the shopping container is redetermined based on the plurality of objects in the shopping container including the first object.

Additionally or alternatively, in some examples, the method further comprises: determining that a first object of the plurality of objects in the shopping container does not satisfy one or more second criteria; and in response to determining that the first object of the plurality of objects does not satisfy the one or more second criteria, presenting, via the display, a visual indication that the first object does not satisfy the one or more second criteria. Additionally or alternatively, in some examples, the method further comprises: while in the scoring mode, detecting, via one or more input devices, a change in an orientation of the electronic device that satisfies one or more second criteria; and in response to detecting the change in the orientation of the electronic device that satisfies the one or more second criteria: presenting, via the display, in the three-dimensional environment, one or more representations of content associated with one or more of the plurality of objects in the shopping container in the three-dimensional environment.

Additionally or alternatively, in some examples, the method further comprises: while in the scoring mode, detecting via one or more input devices, movement of a first object from outside the shopping container to within the shopping container, wherein the first object does not satisfy one or more second criteria; and in response to detecting the movement of the first object from outside the shopping container to within the shopping container, maintaining the representation of the score of the shopping container. Additionally or alternatively, in some examples, prior to detecting the shopping container in the three-dimensional environment, the electronic device determines that one or more second criteria are satisfied including a criterion that is satisfied when a location of the electronic device corresponds to a physical marketplace.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at an electronic device in communication with a display and one or more input devices:

presenting, via the display, a three-dimensional environment of the electronic device;

detecting, using the one or more input devices, a shopping container in the three-dimensional environment;

initiating a scoring mode;

while in the scoring mode:

in accordance with a determination that one or more first criteria are satisfied including a criterion that is based on a gaze of a user of the electronic device:

presenting, via the display, a representation of a score of the shopping container in the three-dimensional environment, wherein the score of the shopping container is determined based on a plurality of objects in the shopping container;

detecting via one or more input devices, movement of a first object from within the shopping container to outside the shopping container; and in response to detecting the movement of the first object from within the shopping container to outside the shopping container:

updating the representation of the score of the shopping container in the three-dimensional environment, wherein the score of the shopping container is redetermined based on the plurality of objects in the shopping container without the first object.

2. The method of claim 1, wherein the one or more first criteria include:

a first criterion that is satisfied when at least one object of the plurality of objects in the shopping container corresponds to a consumable object;

a second criterion that is satisfied when a location of the electronic device corresponds to a physical marketplace;

a third criterion that is satisfied when the shopping container is within a predetermined distance from a user of the electronic device; or a fourth criterion that is satisfied when a change in contextual information indicates initiating a purchase of the plurality of objects in the shopping container.

3. The method of claim 1, further comprising:

while the first object of the plurality of objects is associated with a first object score:

in accordance with a determination that one or more second criteria are satisfied, presenting an indication of a second object, different from the first object, associated with a second score that is within a threshold of or greater than the first object score.

4. The method of claim 1, further comprising:

while the first object of the plurality of objects is associated with a first object score:

in accordance with a determination that one or more second criteria are satisfied, presenting, via the display, a representation of the first object score of the first object at a first location that is within a threshold distance from the first object.

5. The method of claim 1, further comprising:

while in the scoring mode, detecting, via one or more input devices, movement of the first object from outside the shopping container to within the shopping container, wherein the first object satisfies one or more second criteria; and in response to detecting movement of the first object from outside the shopping container to within the shopping container:

updating the representation of the score of the shopping container in the three-dimensional environment, wherein the score of the shopping container is redetermined based on the plurality of objects in the shopping container including the first object.

6. The method of claim 1, further comprising:

determining that the first object of the plurality of objects in the shopping container does not satisfy one or more second criteria; and in response to determining that the first object of the plurality of objects does not satisfy the one or more second criteria, presenting, via the display, a visual indication that the first object does not satisfy the one or more second criteria.

7. The method of claim 1, further comprising:

while in the scoring mode, detecting, via one or more input devices, a change in an orientation of the electronic device that satisfies one or more second criteria; and in response to detecting the change in the orientation of the electronic device that satisfies the one or more second criteria:

presenting, via the display, in the three-dimensional environment, one or more representations of content associated with one or more of the plurality of objects in the shopping container in the three-dimensional environment.

8. The method of claim 1, further comprising:

while in the scoring mode, detecting via one or more input devices, movement of the first object from outside the shopping container to within the shopping container, wherein the first object does not satisfy one or more second criteria; and in response to detecting the movement of the first object from outside the shopping container to within the shopping container, maintaining the representation of the score of the shopping container.

9. An electronic device comprising:

one or more processors;

memory; and one or more programs stored in the memory and configured to be executed by the one or more processors, the one or more programs including instructions for:

presenting, via a display, a three-dimensional environment of the electronic device;

detecting, using one or more input devices, a shopping container in the three-dimensional environment;

initiating a scoring mode;

while in the scoring mode:

in accordance with a determination that one or more first criteria are satisfied including a criterion that is based on a gaze of a user of the electronic device:

presenting, via the display, a representation of a score of the shopping container in the three-dimensional environment, wherein the score of the shopping container is determined based on a plurality of objects in the shopping container;

detecting via one or more input devices, movement of a first object from within the shopping container to outside the shopping container; and in response to detecting the movement of the first object from within the shopping container to outside the shopping container:

updating the representation of the score of the shopping container in the three-dimensional environment, wherein the score of the shopping container is redetermined based on the plurality of objects in the shopping container without the first object.

10. The electronic device of claim 9, wherein the one or more first criteria include:

a first criterion that is satisfied when at least one object of the plurality of objects in the shopping container corresponds to a consumable object;

a second criterion that is satisfied when a location of the electronic device corresponds to a physical marketplace;

a third criterion that is satisfied when the shopping container is within a predetermined distance from a user of the electronic device; or a fourth criterion that is satisfied when a change in contextual information indicates initiating a purchase of the plurality of objects in the shopping container.

11. The electronic device of claim 9, wherein the one or more programs further include instructions for:

while the first object of the plurality of objects is associated with a first object score:

in accordance with a determination that one or more second criteria are satisfied, presenting an indication of a second object, different from the first object, associated with a second score that is within a threshold of or greater than the first object score.

12. The electronic device of claim 9, wherein the one or more programs further include instructions for:

while the first object of the plurality of objects is associated with a first object score:

in accordance with a determination that one or more second criteria are satisfied, presenting, via the display, a representation of the first object score of the first object at a first location that is within a threshold distance from the first object.

13. The electronic device of claim 9, wherein the one or more programs further include instructions for:

while in the scoring mode, detecting, via one or more input devices, movement of the first object from outside the shopping container to within the shopping container, wherein the first object satisfies one or more second criteria; and in response to detecting movement of the first object from outside the shopping container to within the shopping container:

updating the representation of the score of the shopping container in the three-dimensional environment, wherein the score of the shopping container is redetermined based on the plurality of objects in the shopping container including the first object.

14. The electronic device of claim 9, wherein the one or more programs further include instructions for:

determining that the first object of the plurality of objects in the shopping container does not satisfy one or more second criteria; and in response to determining that the first object of the plurality of objects does not satisfy the one or more second criteria, presenting, via the display, a visual indication that the first object does not satisfy the one or more second criteria.

15. The electronic device of claim 9, wherein the one or more programs further include instructions for:

while in the scoring mode, detecting, via one or more input devices, a change in an orientation of the electronic device that satisfies one or more second criteria; and in response to detecting the change in the orientation of the electronic device that satisfies the one or more second criteria:

presenting, via the display, in the three-dimensional environment, one or more representations of content associated with one or more of the plurality of objects in the shopping container in the three-dimensional environment.

16. The electronic device of claim 9, wherein the one or more programs further include instructions for:

while in the scoring mode, detecting via one or more input devices, movement of the first object from outside the shopping container to within the shopping container, wherein the first object does not satisfy one or more second criteria; and in response to detecting the movement of the first object from outside the shopping container to within the shopping container, maintaining the representation of the score of the shopping container.

17. A non-transitory computer readable storage medium storing one or more programs, the one or more programs comprising instructions, which when executed by one or more processors of an electronic device, cause the electronic device to perform a method comprising:

presenting, via a display, a three-dimensional environment of the electronic device;

detecting, using one or more input devices, a shopping container in the three-dimensional environment;

initiating a scoring mode;

while in the scoring mode:

in accordance with a determination that one or more first criteria are satisfied including a criterion that is based on a gaze of a user of the electronic device:

presenting, via the display, a representation of a score of the shopping container in the three-dimensional environment, wherein the score of the shopping container is determined based on a plurality of objects in the shopping container;

detecting via one or more input devices, movement of a first object from within the shopping container to outside the shopping container; and in response to detecting the movement of the first object from within the shopping container to outside the shopping container:

updating the representation of the score of the shopping container in the three-dimensional environment, wherein the score of the shopping container is redetermined based on the plurality of objects in the shopping container without the first object.

18. The non-transitory computer readable storage medium of claim 17, wherein the one or more first criteria include:

a first criterion that is satisfied when at least one object of the plurality of objects in the shopping container corresponds to a consumable object;

a second criterion that is satisfied when a location of the electronic device corresponds to a physical marketplace;

a third criterion that is satisfied when the shopping container is within a predetermined distance from a user of the electronic device; or a fourth criterion that is satisfied when a change in contextual information indicates initiating a purchase of the plurality of objects in the shopping container.

19. The non-transitory computer readable storage medium of claim 17, wherein the one or more programs further comprise instructions for:

while the first object of the plurality of objects is associated with a first object score:

in accordance with a determination that one or more second criteria are satisfied, presenting an indication of a second object, different from the first object, associated with a second score that is within a threshold of or greater than the first object score.

20. The non-transitory computer readable storage medium of claim 17, wherein the one or more programs further comprise instructions for:

while the first object of the plurality of objects is associated with a first object score:

in accordance with a determination that one or more second criteria are satisfied, presenting, via the display, a representation of the first object score of the first object at a first location that is within a threshold distance from the first object.

21. The non-transitory computer readable storage medium of claim 17, wherein the one or more programs further comprise instructions for:

while in the scoring mode, detecting, via one or more input devices, movement of the first object from outside the shopping container to within the shopping container, wherein the first object satisfies one or more second criteria; and in response to detecting movement of the first object from outside the shopping container to within the shopping container:

updating the representation of the score of the shopping container in the three-dimensional environment, wherein the score of the shopping container is redetermined based on the plurality of objects in the shopping container including the first object.

22. The non-transitory computer readable storage medium of claim 17, wherein the one or more programs further comprise instructions for:

determining that the first object of the plurality of objects in the shopping container does not satisfy one or more second criteria; and in response to determining that the first object of the plurality of objects does not satisfy the one or more second criteria, presenting, via the display, a visual indication that the first object does not satisfy the one or more second criteria.

23. The non-transitory computer readable storage medium of claim 17, wherein the one or more programs further comprise instructions for:

while in the scoring mode, detecting, via one or more input devices, a change in an orientation of the electronic device that satisfies one or more second criteria; and in response to detecting the change in the orientation of the electronic device that satisfies the one or more second criteria:

presenting, via the display, in the three-dimensional environment, one or more representations of content associated with one or more of the plurality of objects in the shopping container in the three-dimensional environment.

24. The non-transitory computer readable storage medium of claim 17, wherein the one or more programs further comprise instructions for:

while in the scoring mode, detecting via one or more input devices, movement of the first object from outside the shopping container to within the shopping container, wherein the first object does not satisfy one or more second criteria; and in response to detecting the movement of the first object from outside the shopping container to within the shopping container, maintaining the representation of the score of the shopping container.

* * * * *